United States Patent [19]

Jäckel

[11] 4,383,596
[45] May 17, 1983

[54] CENTRIFUGAL-FORCE FRICTION CLUTCH WITH A TORQUE TRANSMISSION DEPENDENT ON SPEED

[75] Inventor: Johann Jäckel, Bühl, Fed. Rep. of Germany

[73] Assignee: LuK Lamellen und Kupplungsbau GmbH, Bühl, Fed. Rep. of Germany

[21] Appl. No.: 144,900

[22] Filed: Apr. 29, 1980

[30] Foreign Application Priority Data

Apr. 30, 1979 [DE] Fed. Rep. of Germany ....... 2917448

[51] Int. Cl.³ ............................................. F16D 43/14
[52] U.S. Cl. .............................. 192/3.31; 192/103 B; 192/105 BA; 192/105 CE
[58] Field of Search ........... 192/3.31, 103 B, 105 CD, 192/105 CE, 105 BA

[56] References Cited

U.S. PATENT DOCUMENTS

| | | | |
|---|---|---|---|
| 2,970,680 | 2/1961 | Cain | 192/105 CD |
| 3,024,886 | 3/1962 | Peras | 192/105 CE |
| 3,151,717 | 10/1964 | Kaptur et al. | 192/3.31 X |
| 4,124,106 | 11/1978 | Clauss | 192/3.31 |
| 4,226,309 | 10/1980 | Siuberschlag | 192/3.31 |

FOREIGN PATENT DOCUMENTS 567676 2/1945 United Kingdom ............ 192/103 B

Primary Examiner—Rodney H. Bonck
Attorney, Agent, or Firm—Kontler, Grimes & Battersby

[57] ABSTRACT

A centrifugal-force friction clutch with a torque transmission dependent on the speed of rotation has a hub-shaped input part, a drum-shaped part to be driven, a clutch output centrifugal weights acting upon the drum-shaped part. In a first speed stage the weights are held back to prevent torque transmission, in a second speed stage, the torque increases at least substantially proportionally to the increase in centrifugal force and friction, and in a third speed stage, less torque is transmitted than is proportional to the centrifugal force and friction. Radially displaceable friction shoes are fixed with respect to the output and are movable radially outwardly by the weights to transmit torque, and means are provided for resiliently holding back radially outward movement of the friction shoes. The weights are tiltable relative to the friction shoes and are radially displaceable by centrifugal force with the friction shoes.

18 Claims, 4 Drawing Figures

CENTRIFUGAL-FORCE FRICTION CLUTCH WITH A TORQUE TRANSMISSION DEPENDENT ON SPEED

The invention relates to a centrifugal-force friction clutch with a torque transmission dependent on the speed of rotation, having an input part and a part to be driven, the input part being a hub-like part and the part to be driven being a drum-like part to be acted upon by centrifugal weights; wherein no torque transmission takes place during a first speed stage, the centrifugal weights being held back, a torque at least approximately proportional to the increase in the centrifugal force and the friction coefficient being transmitted during a further speed stage, a torque being transmitted during a third speed stage going beyond the latter, which is less than the torque which is proportional in this stage to the centrifugal force and the friction coefficient; and where a multiplicity of radially displaceable friction shoes are disposed so as to be fixed with respect to an output part of the clutch, the friction shoes being under the resiliently outward influence of holding-back means in the radial direction, while they are movable, on the other hand, radially outwardly by the centrifugal weights.

Such a centrifugal-force friction clutch has been proposed for motor vehicles with a hydraulic torque converter as so-called converter bridging clutch. This has been provided in order to prevent slippage and power losses between the pump wheel and the turbine wheel connected therewith from a given speed on. The first speed stage mentioned is in that range which is below the idling speed and during which the clutch transmits no torque. After the engagement of the clutch starts, however, the latter is to transmit a torque which is greater than the output torque produced at the output shaft or the turbine shaft if the speed is increased only relatively little, which necessitates relatively heavy centrifugal weights. On the other hand, a reduced torque increase of the centrifugal-force friction clutch is to take place from this speed range on, so that the speed, from which point on the centrifugal-force friction clutch transmits the full torque and no longer slips, is reached only at a considerably higher value. Therefore, the effect of the centrifugal forces is partially taken up over this third speed range. The centrifugal weights are therefore divided up; when the second speed stage is reached, a first centrifugal weight, constructed for instance, in the form of a friction shoe, and a second centrifugal weight, move the friction shoes outward and transmit the corresponding torque.

Upon reaching the third speed stage and throughout the latter, the effect of the second centrifugal weights is partially cancelled, since they are radially intercepted at a stop; a spring which is pre-tensioned in this condition is operative between the first centrifugal weights (or friction shoes) and the second centrifugal weights. The construction of the converter bridging clutch is such that a part to be driven by the engine is firmly connected to the pump wheel, and the turbine wheel, formed as a hub-like part, is the input part for the transmission shaft.

The centrifugal-force device proper, at which the friction shoes are provided, is disposed between the turbine wheel and the converter housing to be driven by the engine. Furthermore, between its output part and the input part for the transmission shaft, a free-wheeling device is provided, which makes it possible for the pump wheel to rotate faster than the part provided with the centrifugal weights. However, relative motion between this part or the output part in the opposite direction of rotation is prevented. The rotary motion to the centrifugal-force device is transmitted by the volume of oil which co-rotates in the converter housing. The point of complete bridging is reached at the speed at which the torque transmitted by the clutch and the turbine becomes equal to or larger than the engine torque.

An object of the invention is to provide a centrifugal-force friction clutch with a torque transmission dependent on speed, which constitutes an improvement over the heretofore-known devices of this general type, and is in the form of a converter bridging clutch which can be assembled of simple elements such as stamped parts, and wherein fewer individual parts can be used to thereby allow cost-effective production and facilitate the assembly. In addition, the operation is to be improved, for instance, by effecting the support of the friction shoes and the centrifugal weights by means of more easily controlled elements.

With the foregoing and other objects in view, there is provided, in accordance with the invention, a centrifugal-force friction clutch with a torque transmission dependent on the speed of rotation, comprising a hub-shaped input part, a drum-shaped part to be driven, a clutch output, centrifugal weights acting upon the drum-shaped part to be driven, in a first speed stage the weights being held back to prevent torque transmission, in a second speed stage torque being increasingly transmitted at least substantially proportionally to the increase in centrifugal force and friction, and in a third speed stage exceeding the second speed stage less torque being transmitted than is proportional to the centrifugal force and friction, a multiplicity of radially displaceable friction shoes being fixed with respect to the output part and being movable radially outwardly by the weights to transmit torque, and means for resiliently holding back radially outward movement of the friction shoes, the weights being tiltable relative to the friction shoes and being radially displaceable by centrifugal force with the friction shoes.

In accordance with another feature of the invention, in the second speed stage the centers of gravity of the weights are displaced relative to the friction shoes, and there are provided pivot points for weights, limiting means for bracing the weights at the pivot points thereof for the tilting in the third speed stage, and support points or stops on the friction shoes for the weights, the centers of gravity of the weights being disposed between the support points as seen in the circumferential direction.

In accordance with a further feature of the invention, there are provided energy accumulators such as yieldable biasing means in the form of coil springs disposed between the weights, the weights and friction shoes being radially displaceable in the first speed stage until contact with the part to be driven which terminates the first speed stage, the limiting means including stops formed on the weights and stopping portion of the output, the weights being tilted relative to the friction shoes in the second speed stage against the force of the energy accumulators until each weight contacts the corresponding stopping portion of the output part, the center of gravity of each of the weights being disposed between the respective pivot point and the corresponding stopping portion of the output as seen in the circumferential direction.

In accodance with an added feature of the invention, two weights tiltable in opposite directions are associated with each friction shoe, the weights being pivotable at different pivot points relative to the associated friction shoe, as considered in the circumferential direction, and the centers of gravity of the weights are disposed between the pivot points as seen in the circumferential direction.

In accordance with an additional feature of the invention, the energy accumulators act on the weights against tilting, the extent of tilting being increased with increased centrifugal force.

In accordance with yet another feature of the invention, there is provided a further stop for the weights, the energy accumulators pressing the pivot points of the weights against the further stops at most until the end of the first speed stage.

It is further advantageous if at least one of the output parts which are secured against rotation relative to the friction shoes of the centrifugal-force device has stops acting on a complementary stops of the centrifugal weights, and if the centers of gravity of the centrifugal weights are provided between their pivot points and the respective stops, as seen in the circumferential direction of the clutch.

In accordance with yet a further feature of the invention, the distance between the pivot point of a weight and its the center of gravity exceeds the distance between the stop means and the center of gravity.

In accordance with yet an added feature of the invention, the output is in the form of two side plates holding the weights therebetween, and there are provided energy accumulators in the form of yieldable biasing means, the side plates allowing limited relative rotation against the force of the energy accumulators between the hub-shaped part and the weights. A flange-like structural part is connected to the hub-shaped part which is connected to a turbine wheel and a free-wheeling device is disposed between the hub-shaped part and the turbine wheel. The energy accumulators operate between the side plates and the flange-like structural part.

In accordance with yet an additional feature of the invention, the resilient holding means for the friction shoes are in the form of energy accumulators such as yieldable biasing means disposed in window-shaped cutouts formed in the side plates.

In accordance with still another feature of the invention, there are provided radially-outwardly directed guide extensions integral with the side plates, the guide extensions being received in openings or cutouts formed in the friction shoes to hold the friction shoes against movement relative to the plates, as considered in the circumferential direction but to allow radial displacement of the shoes.

In accordance with a concomitant feature of the invention, the stopping portion of the output is in the form of cutouts or openings with stop contours formed in the side plates, and the stops of the weights are in the form of an embossings extending with clearance into the cutouts and impinging upon the stop contours of the side plates to limit the extent of tilting of the weights with respect to the friction shoes. In this way means are provided in a particularly inexpensive manner to limit the extent of tilting of the centrifugal weights with respect to the friction shoes.

Other features which are considered as characteristic for the invention are set forth in the appended claims.

Although the invention is illustrated and described herein as embodied in a centrifugal-force friction clutch with a torque transmission dependent on speed, it is nevertheless not intended to be limited to the details shown, since various modifications and structural changes may be made therein without departing from the spirit of the invention and from the scope and range of equivalence of the claims.

The construction and mode of operation of the clutch, however, together with additional features and advantages thereof, will be best understood from the following description of specific embodiments when read in connection with the accompanying drawings, in which.

Figure 1:
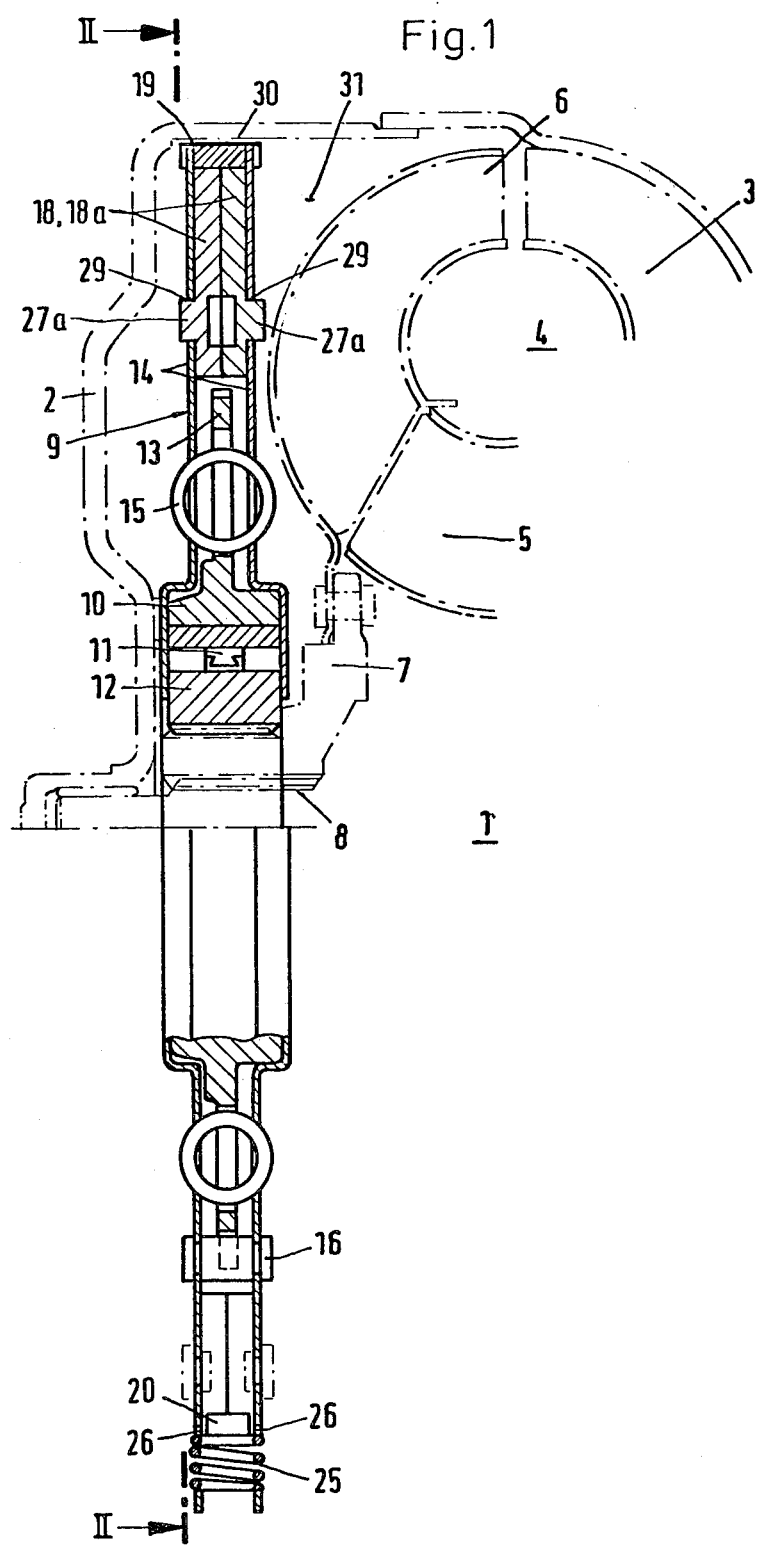
FIG. 1 is a diagrammatic cross-sectional view of a converter bridging clutch taken along the line I—I in FIG. 2, in direction of the arrows.

Referring now to all of the figures of the drawing as a whole, the converter bridging clutch 1 comprises a rotary part 2 which is to be driven by an engine, not specifically shown, and which at the same time constitutes the converter housing. Firmly connected to the converter housing 2 is the pump wheel 3 of the torque converter 4. Further shown are a stator 5 and a turbine wheel 6 which latter is connected to a hub-like input part or component 7 that is in turn engaged through a spline with the transmission input shaft 8.

Another component 9 of the clutch 1 is disposed in the area between the turbine wheel 6 and the converter housing 2. A hublike output part 10 of the component 9 is connected through a free-wheeling device 11 to an intermediate part 12 of the hub 7. The free-wheeling device 11 is of such construction that the hub-like part 7 can overtake the component 9, while a relative rotation between the output part 10 and the hub-like part 7 in the opposite direction is prevented.

The hub part 10 and its flange 13 are surrounded at both sides thereof by two side plates 14 of the component 9. Between these side plates 14 and the hub 10 or the flange 13 of the component 9, a relative rotation at least in a direction of rotation against the action of yieldable biasing means in the form of energy accumulators 15 is possible in order to take up and attenuate torque shocks.

The range of relative rotation between the parts 13 and 10 on the one hand and the plates 14 on the other hand is limited by rivets 16, which can stop at corresponding contours 17 of the flange 13.

The side plates 14 movably support a number of centrifugal weights 18, 18a. One pair of weights 18 and 18a is always associated with a friction shoe 20 provided with a friction lining 19.

The friction shoes 20 each have two cutouts or openings 21, 22, into which arms 23, 24 formed at the side plates 14 extend in the radial direction. These arms permit radial displacement of the friction shoes, but hold the friction shoes against movement in the circumferential direction of the side plates 14.

Each of the friction shoes 20 further has two angled-off end portions 20a, 20b, where the two respective adjacent end portions of two friction shoes are acted upon in the radial direction by a common energy accumulator 25, thereby yieldably urging the friction shoes radially inwardly. These energy accumulators, which are in the form of coil springs, are secured axially in cutouts or openings 26 of the two side plates 14 provided in the radial direction, and are held so as to be braced in the radial direction.

The centrifugal weights 18, 18a each have two embossings 27, 27a formed thereon, with which they extend through window-like coutouts or openings 28, 29 of the side plates 14; more specifically, the embossings or stops 27a remain in their positions of rest, i.e., at least approximately to the end of a first speed stage, against the bracing contours or stops 28a, 29a of the surfaces surrounding the windows 28, 29 due to the force of the springs 25. In this state, there is a distance between the friction linings 19 and the friction counter surface 30 of the housing part 2 which can be driven by the engine.

When the housing 2 and the pump wheel 3 as well as the turbine wheel 6 rotate, the oil in the space 31 is also set in rotation and the component 9 is likewise taken along with a rotary motion.

Figure 2:
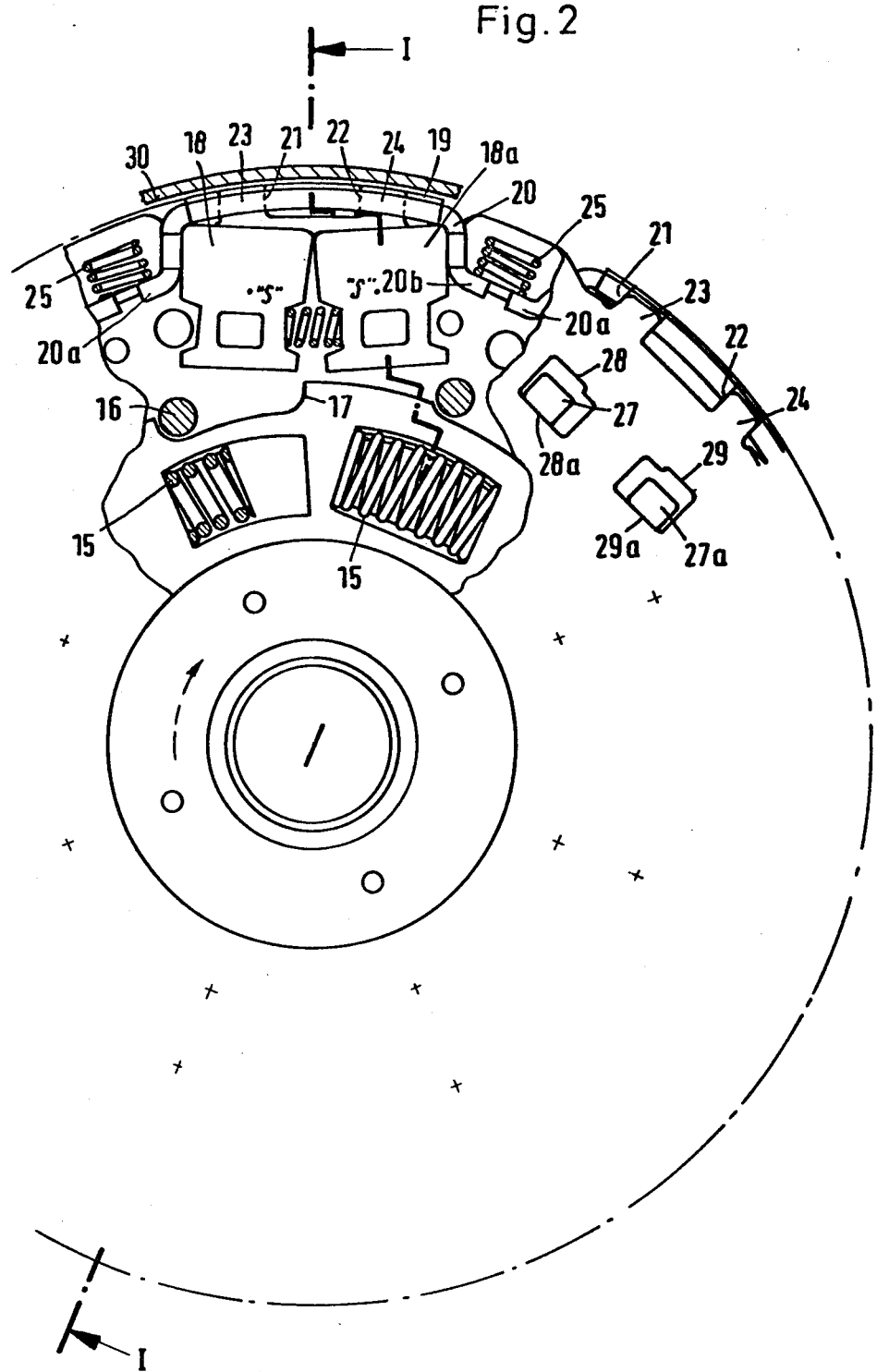
FIG. 2 is a fragmentary view of the converter bridging clutch taken along the line II—II in FIG. 1, in direction of the arrows.

During the first speed stage, no torque is transmitted from the converter housing 2 to the transmission shaft 8 as long as the springs 25 hold the friction shoes 20 in the positions shown in FIGS. 1 and 2. At such time, the friction counter surface 30 of the converter housing 2 is out of contact with the friction linings 19 of the friction shoes 20.

Figure 3:
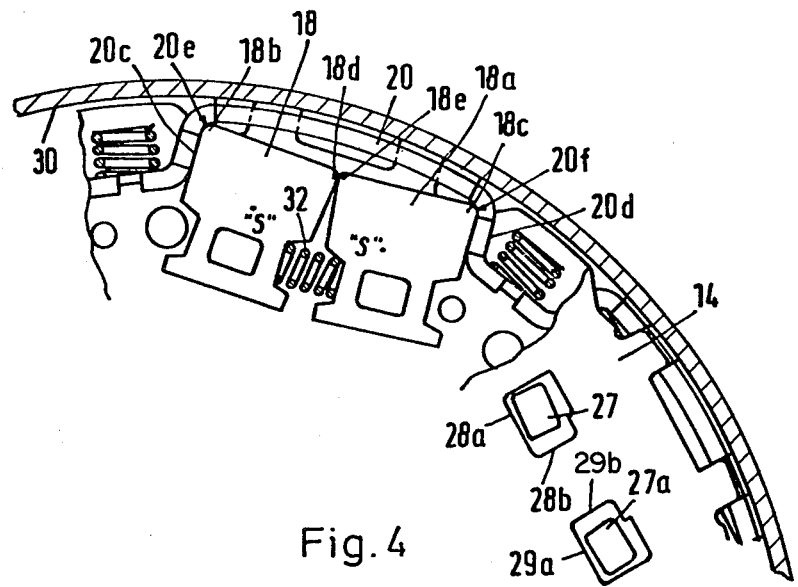
FIGS. 3 and 4 are more detailed fragmentary views of the clutch.

After the speed of the component device 9 exceeds that of the first speed stage, the holding-back force of the springs 25 is overcome. The friction shoes 20 are then displaced together with the centrifugal weights 18, 18a radially outwardly until the friction counter linings 19 come to a stop at the friction surface 30 of the converter housing 2, as is shown in FIG. 3. In this process, a torque proportional to the speed increase and the friction torque is transmitted from the converter housing 2 through the output part 10, the free-wheeling device 11 and the intermediate part 12 to the hub 7 and thereby to the transmission input shaft 8.

It is evident that, in this state, the embossings or stops 27, 27a have been lifted off the contact or stop surfaces 28a, 29a of the side plates 14.

At least approximately over this second speed range, as well as over the previously-mentioned speed range, energy accumulators in the form of coil springs 32 spread apart each pair of centrifugal weights 18, 18a associated with a respective friction shoe 20, and yieldably bias the centrifugal weights against the stop surfaces 20c, 20d of the friction shoes 20 to a stop. The centrifugal weights 18, 18a, however, also have pivot points 18b, 18c, through which they are braced against corresponding abutments or stops 20e, 20f of the friction shoes 20.

However, the centrifugal weights 18, 18a could also be braced against a further swinging-apart caused by the respective spring 32 if provision is made that the centrifugal weights rest against each other with their portions 18d, 18e or that their stops 27, 27a rest against corresponding counter contours or stops 28b, 29b of the cutouts 28, 29.

There is a time at the end of the second speed stage, when the component 9 should not yet transmit its full torque and still have slippage, although it is to transmit its full torque and avoid slippage after the end of the second speed stage and throughout the third speed stage. However, on the other hand, extremely large centrifugal forces would be generated, so that the centrifugal effect of the centrifugal weights is taken up through this third speed stage.

Figure 4:
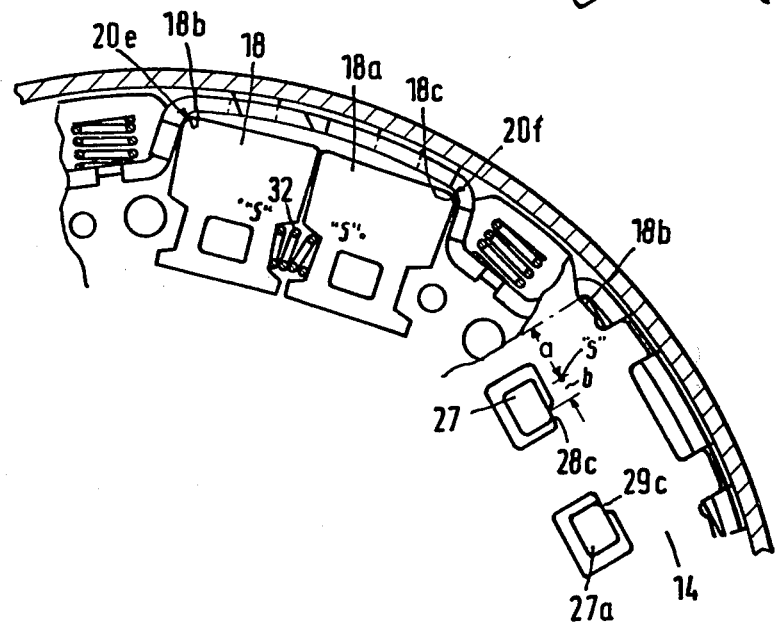

The construction of the centrifugal weights is such that they have their centers of gravity S between their pivot points 18b, 18c. The centers of gravity or the positions of the centers of gravity and the force of the springs 32 are related to each other in such a way that at least approximately at the end of the second speed stage, the centrifugal weights 18, 18a move toward each other. Meanwhile they devolve over their pivot points 18b, 18c and the abutments 20e, 20f and compress the spring 32, until the stops or embossings 27, 27a rest against the stop contours 28c, 29c of the side plates 14, as shown in FIG. 4. Because the centrifugal force effects which would be generated at higher speeds are taken up, easier and less expensive production of the converter bridging clutch is made possible.

The location of the centers of gravity S is chosen in such a way that, as is shown in the right-hand portion of FIG. 4, the distance or lever arm a decisive for the centrifugal force, between the respective pivot point or stop 18b and the center of gravity S, is greater than the distance or lever arm b between the center of gravity and the respective stop or abutment point 28c.

It will be seen that simple, inexpensive production and reliable operation of the apparatus is ensured through the use of simple, easily manufactured and identical parts such as 18, 18a, 20 as well as 14, and the use of well-controlled spring elements in the form of coil springs 25, 32. Nevertheless, the individual speed steps can be defined and held within narrow limits, which, however, does not necessarily exclude hysteresis.

I claim:

1. A centrifugal-force friction clutch for transmission of torque to a substantially drum-shaped rotary part, comprising a first rotary component arranged to rotate at a plurality of speeds including a first speed range, a higher second speed range and a highest third speed range; a second rotary component driven by said first component; a plurality of friction shoes mounted in said first component with freedom of movement substantially radially of said components and into engagement with said rotary part under the action of centrifugal force; means for holding said shoes against radial movement into engagement with said rotary part while the speed of said first component is within said first range; weights provided on said first component, at least one for each of said shoes and each movable with the respective shoe under the action of centrifugal force substantially radially of said first component and each pivotable relative to the corresponding shoe to change the position of its center of gravity and to urge the shoe into frictional engagement with said rotary part while said first component rotates at a speed which is within said second range so that the torque which said shoes transmit between said rotary part and said first component increases at least substantially proportionally with the increase in speed within said second range and the extent of frictional engagement between said shoes and said rotary part; and means for limiting the extent of movement of said weights with reference to the corresponding shoes not later than when said first component begins to rotate at a speed which is within said third range to bring about a relative reduction of torque transmitted between said shoes and said rotary part so that the torque which is transmitted while said first component rotates at a speed which is within said third range continues to increase but at a rate less than proportionally with the increase in speed within said third range and with the extent of frictional engagement between said rotary part and said shoes.

2. A centrifugal-force friction clutch for transmission of torque to a substantially drum-shaped rotary part, comprising a first rotary component arranged to rotate at a plurality of speeds including a first speed range, a higher second speed range and a highest third speed range; a second rotary component driven by said first component; a plurality of friction shoes mounted in said first component with freedom of movement substantially radially of said components and into engagement with said rotary part under the action of centrifugal force; means for holding said shoes against radial movement into engagement with said rotary part while the speed of said first component is within said first range; weights provided on said first component, at least one for each of said shoes and each movable substantially radially of said first component and each pivotable relative to the corresponding shoe to urge the shoe into frictional engagement with said rotary part while said first component rotates at a speed which is within said second range so that the torque which said shoes transmit between said rotary part and said first component increases at least substantially proportionally with the increase in speed within said second range and the extent of frictional engagement between said shoes and said rotary part, the positions of centers of gravity of said weights relative to the respective shoes changing during pivotal movement of the weights relative to the respective shoes; and means for limiting the extent of movement of said weights with reference to the corresponding shoes not later than when said first component begins to rotate at a speed which is within said third range to bring about a relative reduction of torque transmitted between said shoes and said rotary part so that the torque which is transmitted while said first component rotates at a speed which is within said third range continues to increase but at a rate less than proportionally with the increase in speed within said third range and with the extent of frictional engagement between said rotary part and said shoes, said limiting means including stops provided for each of said weights on said first component and on the respective shoes to hold said weights against further pivotal movement while said first component rotates at a speed within said third range.

3. The clutch of claim 2, wherein each of said shoes cooperates with a pair of weights and the centers of gravity of the weights of each pair are disposed between the stops of the respective shoe.

4. The clutch of claim 2, further comprising means for yieldably opposing pivotal movements of said weights with reference to the respective shoes while said first component rotates at a speed within said second range.

5. The clutch of claim 4, wherein the center of gravity of each of said weights is located between the stop of the respective shoe and the respective stop of said first component, as considered in the circumferential direction of said components, while said first component rotates at a speed within said third range.

6. The clutch of claim 2, wherein each of said shoes cooperates with a pair of weights and the weights of each pair are arranged to pivot in opposite directions while said first component rotates at a speed within said second range, the centers of gravity of each pair of weights being disposed between the stops of the respective shoe.

7. The clutch of claim 6, further comprising means for yieldably opposing pivotal movements of the weights of each pair relative to one another while said first component rotates at a speed within said second range.

8. The clutch of claim 7, further comprising additional stops for said weights, said additional stops being provided on said first component and said opposing means being arranged to urge said weights against the respective additional stops while said first component rotates at a speed within said first range.

9. The clutch of claim 7, further comprising additional stops for said weights, said additional stops being provided on the respective shoes and said opposing means being arranged to urge said weights against the respective additional stops while said first component rotates at a speed within said first range.

10. The clutch of claim 2, wherein said first component comprises first and second parts which are turnable, within limits, relative to each other and further comprising means for yieldably opposing angular displacements of said first and second components relative to each other.

11. The clutch of claim 10, wherein said second component includes a hub which is coaxial with said first component and further comprising a freewheel interposed between said first part of said first component and said hub, said shoes and said weights being mounted on the second part of said first component.

12. The clutch of claim 11, wherein said hub forms part of the turbine wheel of a torque converter.

13. A centrifugal-force friction clutch for transmission of torque to a substantially drum-shaped rotary part, comprising a first rotary component arranged to rotate at a plurality of speeds including a first speed range, a higher second speed range and a highest third speed range; a second rotary component driven by said first component; a plurality of friction shoes mounted in said first component with freedom of movement substantially radially of said components and into engagement with said rotary part under the action of centrifugal force; means for holding said shoes against radial movement into engagement with said rotary part while the speed of said first component is within said first range; weights provided on said first component, at least one for each of said shoes and each movable substantially radially of said first component as well as relative to the corresponding shoe to urge the shoe into frictional engagement with said rotary part while said first component rotates at a speed which is within said second range so that the torque which said shoes transmit between said rotary part and said first component increases at least substantially proportionally with the increase in speed within said second range and the extent of frictional engagement between said shoes and said rotary part; and means for limiting the extent of movement of said weights with reference to the corresponding shoes not later than when said first component begins to rotate at a speed which is within said third range to being about a relative reduction of torque transmitted between said shoes and said rotary part so that the torque which is transmitted while said first component rotates at a speed which is within said third range continues to increase but at a rate less than proportionally with the increase in speed within said third range and with the extent of frictional engagement between said rotary part and said shoes, said limiting means comprising a first and a second stop for each of said weights, said first stops being provided on said first component and said second stops being provided on the respective shoes, said weights having first and second portions which respectively abut against the corresponding first and second stops while said first component rotates at a speed within said third range and said weights having centers of gravity disposed between the respective first and second stops.

14. The clutch of claim 13, wherein the distance between the center of gravity of each weight and the respective second stop exceeds the distance between such center of gravity and the respective first stop.

15. A centrifugal-force friction clutch for transmission of torque to a substantially drum-shaped rotary part, comprising a first rotary component arranged to rotate at a plurality of speeds including a first speed range, a higher second speed range and a highest third speed range, said first component comprising first and second parts which are turnable, within limits, relative to each other; a second rotary component driven by said first component, said second component including a hub which is coaxial with said first component; a freewheel interposed between said first part of said first component and said hub; means for yieldably opposing angular displacements of said first and second components relative to each other; a plurality of friction shoes mounted on the second part of said first component with freedom of movement substantially radially of said components and into engagment with said rotary part under the action of centrifugal force; means for holding said shoes against radial movement into engagement with said rotary part while the speed of said first component is within said first range; weights provided on the second part or said first component, at least one for each of said shoes and each movable substantially radially of said first component as well as relative to the corresponding shoe to urge the shoe into frictional engagement with said rotary part while said first component rotates at a speed which is within said second range so that the torque which said shoes transmit between said rotary part and said first component increases at least substantially proportionally with the increase in speed within said second range and the extent of frictional engagement between said shoes and said rotary part, said second part of said first component comprising a pair of plates flanking said weights and having openings for said holding means; and means for limiting the extent of movement of said weights with reference to the corresponding shoes not later than when said first component begins to rotate at a speed which is within said third range to bring about a relative reduction of torque transmitted between said shoes and said rotary part so that the torque which is transmitted while said first component rotates at a speed which is within said third range continues to increase but at a rate less than proportionally with the increase in speed within said third range and with the extent of frictional engagement between said rotary part and said shoes.

16. The clutch of claim 15, wherein said holding means includes springs arranged to yieldably urge the respective shoes radially inwardly.

17. The clutch of claim 15, wherein said shoes have openings and said plates have projections extending into the openings of said shoes to guide the shoes for movement substantially radially and to hold the shoes against movement in the circumferential direction of said components.

18. The clutch of claim 15, wherein each of said plates has a window for each of said weights and said weights have portions extending with clearance into the respective windows, said plates further having surfaces bounding said windows and forming part of said limiting means.

* * * * *